(12) United States Patent
Tapper

(10) Patent No.: US 6,910,275 B2
(45) Date of Patent: Jun. 28, 2005

(54) CABLE-STRIPPING TOOL

(75) Inventor: Johan Tapper, Hedemora (SE)

(73) Assignee: Pressmaster AB, Alvdalen (SE)

( * ) Notice: Subject to any disclaimer, the term of this patent is extended or adjusted under 35 U.S.C. 154(b) by 7 days.

(21) Appl. No.: 10/307,414

(22) Filed: Dec. 2, 2002

(65) Prior Publication Data

US 2003/0110638 A1 Jun. 19, 2003

(30) Foreign Application Priority Data

Dec. 19, 2001 (SE) .............................................. 0104300

(51) Int. Cl.[7] .......................... B26B 27/00; H02G 1/12
(52) U.S. Cl. .......................... 30/90.1; 30/90.4; 30/90.6; 30/90.7
(58) Field of Search ................................. 30/90.1, 90.7, 30/90.6, 90.8, 90.2, 90.3, 90.4, 90.5, 93, 94, 95, 91.2, 105; 81/9.44

(56) References Cited

U.S. PATENT DOCUMENTS

| | | | | | |
|---|---|---|---|---|---|
| 1,866,095 A | * | 7/1932 | Foley | .......................... | 30/90.7 |
| 3,826,001 A | * | 7/1974 | Bilbrey et al. | ................ | 30/90.1 |
| 3,881,249 A | * | 5/1975 | Cox, Jr. | ........................ | 30/90.7 |
| 3,946,487 A | * | 3/1976 | Bieganski | .................... | 30/90.7 |
| 4,472,877 A | * | 9/1984 | Undin et al. | .................. | 30/90.7 |
| 4,526,068 A | * | 7/1985 | Undin et al. | ................... | 81/9.4 |
| 5,345,681 A | * | 9/1994 | Undin | ......................... | 30/90.7 |
| 5,487,220 A | * | 1/1996 | Saitou | ......................... | 30/90.6 |
| 5,809,652 A | * | 9/1998 | Ducret | ......................... | 30/90.7 |
| 6,073,349 A | | 6/2000 | Liversidge | ................... | 30/90.7 |
| 6,334,253 B1 | * | 1/2002 | Cheng | ......................... | 30/90.7 |

\* cited by examiner

*Primary Examiner*—Allan N. Shoap
*Assistant Examiner*—Ghassem Alie
(74) *Attorney, Agent, or Firm*—Jacobson Holman PLLC

(57) ABSTRACT

A cable-stripping tool having a body with first and second openings in an upper wall thereof, a central pin mounted in the body with an upper end thereof carrying a cutting blade and projecting through the first opening, and a hook having a concave side which faces toward the cutting blade to receive a cable to be stripped protecting through the second opening. A carrier element is supported on the central pin and axially movable relative thereto, the carrier element being provided with a latching device to which the free end of the stem portion of the hook is coupled such that the hook is axially movable with the carrier element. The latching device coacts with the stem to secure the hook to the carrier element during use of the tool and is actuatable from outside the tool without dismantling the tool such that the stem can be released from the latching device using an instrument and the hook withdrawn for replacement thereof with another hook.

20 Claims, 3 Drawing Sheets

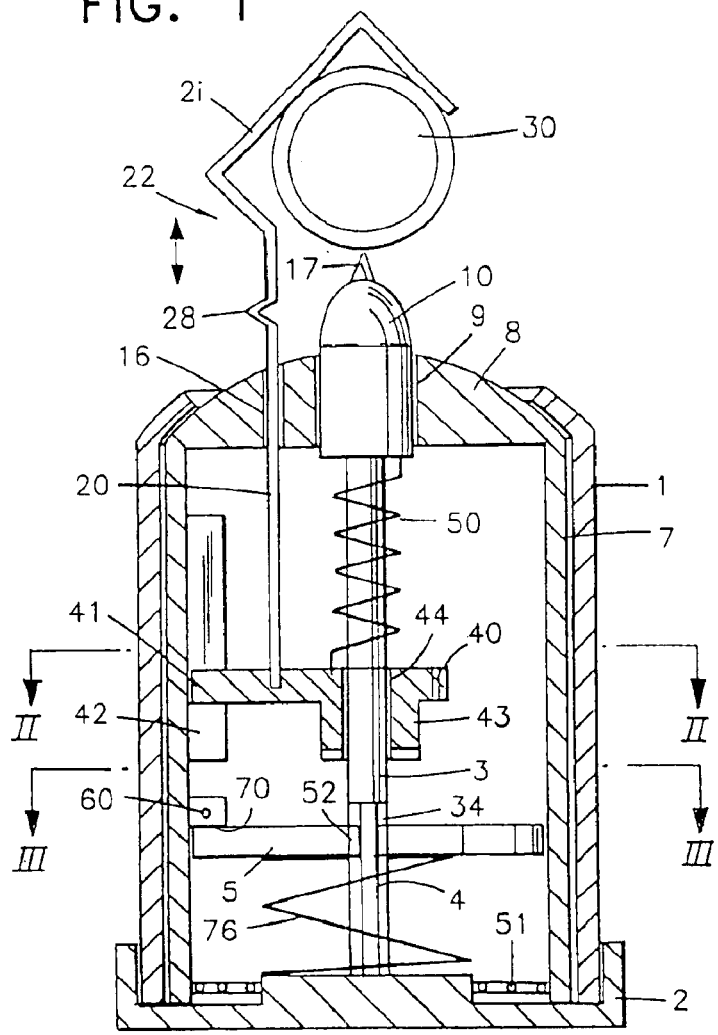
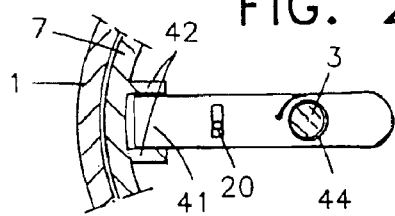
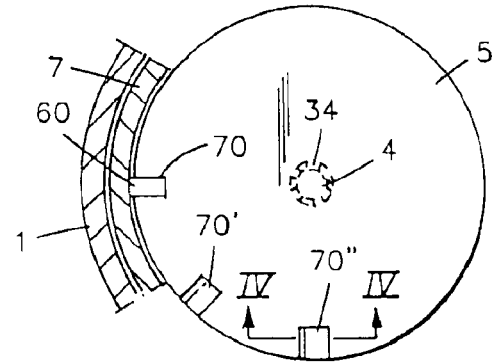
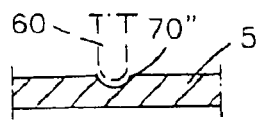
FIG. 1
FIG. 2
FIG. 3
FIG. 4

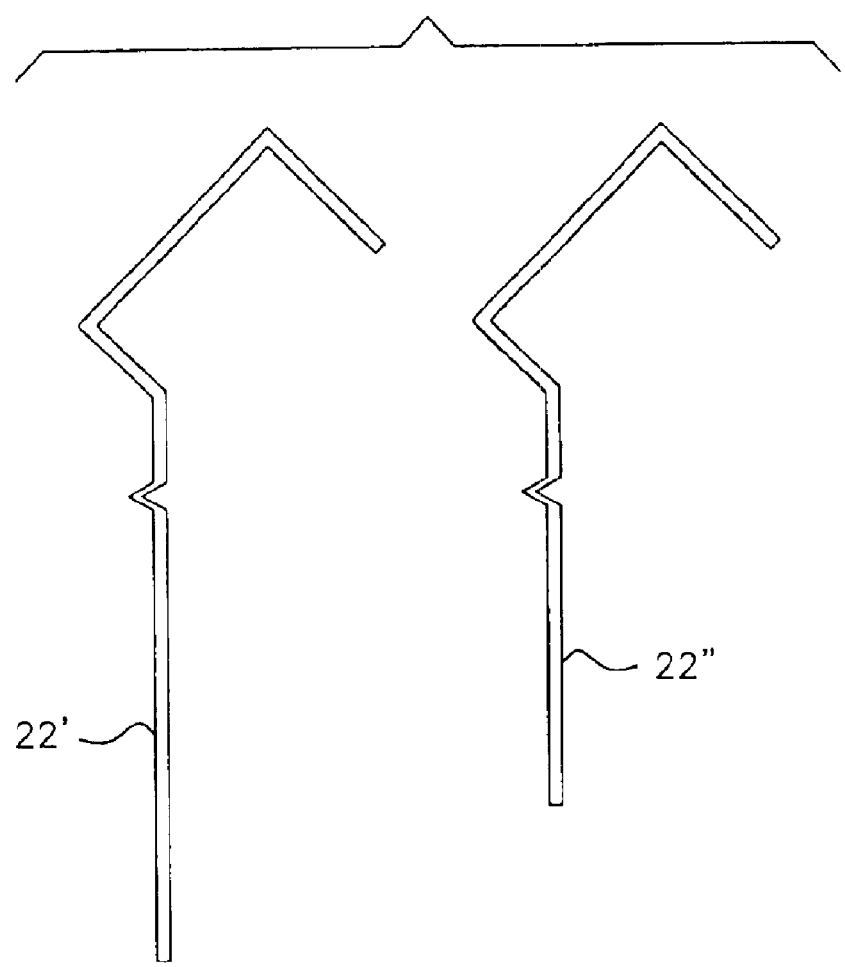

CABLE-STRIPPING TOOL

BACKGROUND OF THE INVENTION

1. Field of the Invention

The present invention relates to a cable-stripping tool having first and second parts which can rotate relative to one another about an axis and of which a first part carries a cutting blade in the vicinity of the axis and a second part carries a hook which can move axially and which is biased toward an end position relative to the cutting blade by means of a spring element. The hook has a concave side which faces toward the cutting blade and which functions to receive the cable to be stripped, and also includes a generally axially oriented stem with which the hook is connected to the tool.

2. Description of the Related Art

U.S. Pat. No. 6,073,349 teaches a cable-stripping tool which comprises a first part and a second part that can be rotated relative to each other about an axis and of which the first part carries a cutting blade and the second part carries a hook. The hook is axially moveable and is biased towards an end position relative to the cutting blade by means of spring means, wherein the hook has a concave side that faces towards the cutting blade for receiving a cable to be stripped, and wherein the hook has a generally axially orientated stem with which the hook is connected to the tool.

One drawback with a tool of this and other known tools of this kind is that the hook element cannot be readily replaced.

SUMMARY OF THE INVENTION

Accordingly, one object of the invention is to provide a tool construction that will enable the hook element to be easily replaced.

Another object is to provide hook elements of different lengths for use with said tool.

A further object is to propose a design of the stem-portion of the hook element, such as an instrument with which a latch mechanism provided in the tool can be actuated to releasably couple the stem-end of the hook element to the guide body.

The tool spring that biases the hook, and therewith the cable, towards the tool cutting blade normally has a characteristic that sets the correct engagement force between the cutting blade and the cable solely within a limited axial deformation region of the spring.

One advantage afforded by the possibility of exchanging the hook elements of the tool is that it is then possible to chose between hook elements of mutually different lengths that are intended for co-action with cables of corresponding diameter sizes within which the spring is able to give the cutting blade correct abutment pressure against the cable.

The object is achieved, either completely or partially, with a cable-stripping tool according to the present invention.

The present invention is directed to a cable-stripping tool having two parts which can rotate relative to one another about an axis and of which a first part carries a cutting blade in the vicinity of the axis and a second part carries a hook which can move axially and which is biased towards an end position relative to the cutting blade by means of a spring element. The hook has a concave side which faces towards the cutting blade and which functions to receive the cable to be stripped, and also includes a generally axially oriented stem with which the hook is connected to the tool. The spring element acts against a carrier element, which can be moved axially towards and away from the end position by means of the second part, and is adapted to bias the carrier element to its end position. The carrier element carries a latching device which is able to latch with a coacting formation on the stem, the latching device being actuatable from outside the tool without dismantling the tool. In addition to the first mentioned hook, there is provided a further hook which includes the formation on its stem for coaction with the latching device, the effective length of the stem of the further hook being different from the effective length of the stem of the first mentioned hook.

According to the preferred embodiment, the tool includes an opening which affords access to the latching device from outside the tool, with the aid of an instrument, so as to cause the latching device to release the hook stem. The instrument may be comprised of the free end of the hook stem.

As further embodiments, the latching device is biased to its latching state, and the hook stem is designed to initially open the latching device as it is inserted in the carrier element so that the formation on the stem can be brought into coaction with the latching device by axial displacement of the stem. The end position of the carrier element may be defined by the unloaded state of the spring element.

The latching device may further include a spring loaded latch pin, with the formation including an opening through the hook stem. The hook stem may include an inclined surface with which the latch pin can be returned from its engagement position against its spring bias when the stem is inserted into the carrier element.

The first and second parts may be spring-biased towards a pre-chosen relative position of rotation in which the stem latching device is in alignment with the latch device access openings. The hook stem of the tool may further have an abutment which defines a hook end position by axial coaction with the second part.

BRIEF DESCRIPTION OF THE DRAWINGS

A cable-stripping tool according to the invention will now be described by way of example with reference to the accompanying drawings.

FIG. 1 is a schematic axial sectioned view of a cable-stripping tool.

FIG. 2 is a schematic view taken on the line II—II in FIG. 1.

FIG. 3 is a schematic sectioned view taken on the line III—III in FIG. 1.

FIG. 4 is a schematic sectioned view taken on the line IV—IV in FIG. 3.

FIG. 8 is an illustration of two replacement hooks having different stem lengths in accordance with the present invention.

DETAILED DESCRIPTION OF THE PREFERRED EMBODIMENTS

Figure 5:
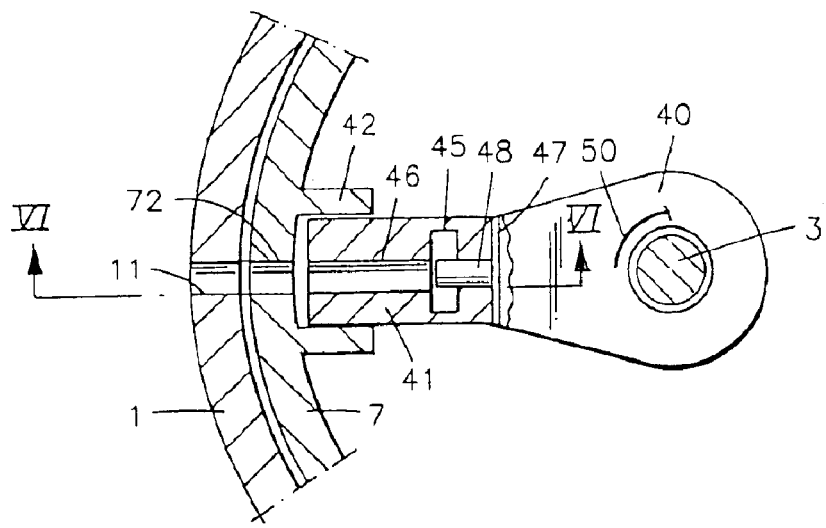
FIG. 5 is a view corresponding to FIG. 2 and shows a variant of the hook-stem carrier element.
Figure 6:
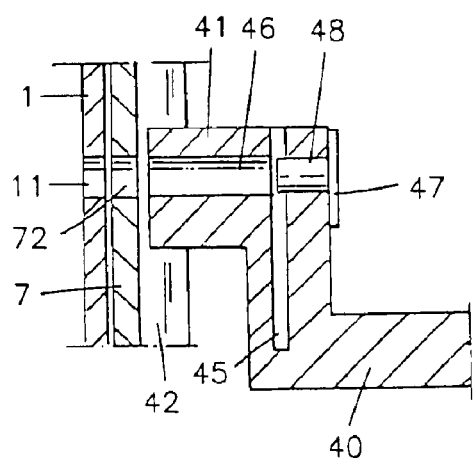
FIG. 6 is a schematic sectioned view taken on the line VI—VI in FIG. 5.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIGS. 1–4 illustrate a tool for stripping a cable 30.

The tool includes a generally tubular handgrip 1 which includes a bottom 2 that carries a central pin 3. The pin includes an end-part 10 which extends out of the tool and carries a cutting blade 17. A body 7 is mounted in the tubular tool 1 for rotation relative to the handgrip 1. The tool thus includes parts that can rotate relative to one another, namely a first part that includes the handgrip 1 and the pin 3, and a second part that includes the body 7.

The body includes a wall 8 that has a central opening 9 through which the end-part 10 of the pin extends. In an eccentric position, the wall 8 has an opening 16 for accommodating a straight stem 20 whose end is connected to a carrier element 40 that is axially movable in relation to the body 7 but non-rotatable relative to said body. It will be seen that the carrier element 40 has an opening 44 through which the pin 3 extends. The element 40 includes a nose 41 that engages between two axially extending and mutually parallel guide flanges 42 on the body 7.

The hook 22 has a hook-portion 21 which is adapted to centre the cable 30 against the cutting blade 17.

A spring 50 is shown to act axially between the end-part 10 of the pin 3 and the carrier element 40, so as to cause the cable 30 to be pressed against the cutting blade 17 through the medium of the hook-part 21 of the hook element 22.

The bottom end-part of the pin 3 includes external, axially extending splines 4 that engage with corresponding axial splines 34 on an opening wall 52 on a cam disc. The cam disc 5 is thus movable axially along the pin 3 and is secured against rotation relative thereto by the engagement between respective spline formations 4, 34. The body 7 carries a cam follower 60 which co-acts with a peripheral region of the cam disc 5. In this peripheral region, there are found circumferentially spaced formations or recesses 70', 70" with which the cam follower 60 can engage. Arranged between the bottom-part 2 of the handgrip and the cam disc 5 is a pressure spring 76 which biases the disc 5 into contact with the cam follower 60.

Mounted between the handgrip and the body 7 is a spring 51 which strives to return the handgrip 1 and the body 7 to a mutual position of rotation in which the cam follower 60 rests on the upper side of the cam disc in a position of recess 70 which, for example, may correspond to the blade 17 lying in a plane normal to the axial direction of the cable 30.

The cam disc formation 70' (rounded recess) is able to define in co-action with the cam follower 60 a cutting blade orientation in which the blade cuts a helical slit in the casing of the cable 30 as the tool (the hook 21) rotates about the cable axis. The third recess formation 70" corresponds to the cutting blade 17 lying in an axial plane in respect of the cable 30. Thus, the cutting blade 17 can be set to stable positions of rotation relative to the body 7, and therewith relative to the hook 22, against the action of the spring 51, with the aid of the recesses 70', 70" and the cam follower 60.

FIG. 1 shows a downwardly and forwardly projecting symmetrical part 43 on the carrier element 40.

When the hook element 22 is released firm a position in which the spring 50 is pressure-loaded, the hook and its carrier element 40 will move downwards towards the cam disc 5, wherein the characteristic and length of stroke of the spring 50 are selected so that the forwardly projecting part 43 of the carrier element will drive the cam disc 5 down against the action of its axial biasing spring 76, so that the disc 5 will pass free from its engagement with the cam follower 60. The spring 51 then returns the handgrip 1 and the body 7 to a normal position. The spring 50 may be adapted to knock the disc 5 down and out of engagement with the cam follower temporarily, when the hook is released. Alternatively, the spring 50 may be allowed to overcome the spring 76 so that the body 40 presses the disc 5 down and out of engagement with the cam follower.

It will be seen from FIG. 4 that the cam follower 60 and the formations/recesses 70', 70" in the cam disc 5 are rounded such that an operator can cause the cam disc 5 to rotate by turning the handgrip 1 when the hook 22 is fitted to a cable 30, so that the cam follower 60 will be received in a chosen recess 70', 70", wherewith co-action between the cam follower and the recess establishes a stop against rotation, even against the action of the return spring 51. Naturally, mutual rotation between the handgrip 1and the body 7 requires the cam follower 60 and the cam disc 5 to move axially in relation to each other, which is permitted by the spring 76. The spring 76 in combination with the curvatures of the cam follower 60 and the co-action of the recesses 70 thus provides a holding force against the action of the return spring 51. Moreover, the cam follower 60 and the recesses 70 shall produce a wedging effect that promotes axial displacement of the cam disc towards the spring 76 when torque is applied.

It will be seen from FIG. 5 that the carrier element 40 has an axially directed recess 45 which receives the bottom end-part of the hook stem 20. The nose part 41 of the element has a radially directed channel 46 which is aligned with an opening 72 in the body 7 and an opening 11 in the handgrip 1 when the tool is in a normal state in which it is held by the spring 51.

It will also be seen that a spring tongue 47 fastened to the carrier element 40 carries a locking pin 48 which extends through a corresponding guide and into the channel 45 so as to engage a latching opening 24 in the hook stem 20 when said stem is inserted down into the channel 45. It will also be seen that the end of the hook stem 20 is bevelled at 26, therewith forming an inclined surface that is able to drive away the locking pin 48 as the hook stem 20 is inserted into the channel 45.

Figure 7:
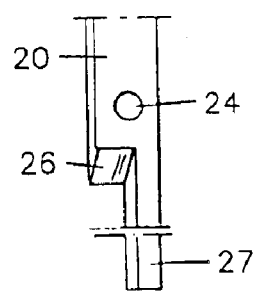
FIG. 7 is a schematic illustration of the end-part of the hook stem.

It will also be seen in FIG. 7 that the end-part of the hook stem includes a narrow, elongate rod-portion 27. The rod-portion 27 on the stem-end of a replacement hook 22', 22", as shown in FIG. 8, can be inserted in through the openings 11, 72 and the channel 46 so as to urge the latching pin 48 out of the opening 24, whereafter the hook element 22 of said tool can be lifted up and passed free from the latching pin 48, whereafter the rod 27 of the replacement hook 22', 22" is drawn out to permit continued withdrawal of the hook element 22 of said tool.

The stem part of the replacement hook can then readily be placed in position through the eccentric guide channel 16 and down into the receiving channel 45 of said carrier element, wherewith the spring element 47 causes the carrier pin 48 to engage with the opening 24 when the stem 20 has taken its correct position in the element 40. Replacement hooks 22', 22" having stems of different lengths may thus be inserted as necessary to accommodate cables of different diameter sizes.

The bottom plate 2 of the handgrip may include a container for keeping replacement cutting blades 17.

The hook stem may include a shoulder 28 that co-acts with the wall 8 on the upper side of the body so as to define a hook end position. The latch mechanism for attachment of the hook stem is thus exposed through the openings.

In the case of one embodiment, the spring 50 is stronger than the spring 76 so that the cam disc 5 will be held pressed down at a distance beneath the cam follower 60 when the tool is not subjected to load (no cable in the hook). The hook stem 20 may include the shoulder 28 that co-acts with the wall 8 on the upper side of the body 7 so as to define a lower end position of the carrier element 40 (and the disc 5) as biased by the spring 50.

As a cable 30 is inserted into the hook, the hook is lifted so that the spring 50 will no longer act against the cam disc 5, wherewith the spring 76 is able to press the cam disc 5 against the cam follower 60. The body 7 and the handgrip 1 can now be rotated manually to stable positions of rotation defined by the engagement of the cam follower 60 with respective formations 70, 70', 70" of the cam disc 5.

The opening 46 in the body 40 can be kept in alignment with the openings 11, 72 in the axial direction of the tool with the aid of the spring SO, for instance in its unloaded state (if the body 40 then passes free from the disc 5), or by the springs 50, 76 in their mutually balanced state, or by co-action of the shoulder 28 with the end wall 8 under the influence of the spring 50.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A cable-stripping tool comprising:
    a body having first and second openings in an upper wall thereof;
    a central pin mounted in said body and extending in a generally axial orientation with respect thereto, an upper end part of said pin carrying a cutting blade and projecting through said first opening;
    a carrier element that is supported on said central pin and axially movable relative thereto, said carrier element having a latching device thereon and being biased toward an end position by a spring;
    a hook having a stem that passes through said second opening so as to be generally parallel with respect to said pin, and a curved upper hook portion with a concave side which faces toward said cutting blade to receive a cable to be stripped, a free end of said stem remote from said hook portion being coupled to said carrier element by said latching device so that said hook is axially movable with said carrier element;
    said latching device coacting with said hook stem to secure said hook to said carrier element during use of said tool and being actuatable from outside said tool without dismantling said tool such that said hook stem may be released from said latching device using an instrument and said hook withdrawn through said second opening for replacement thereof with another hook.

2. The cable-stripping tool as set forth in claim 1, wherein said latching device is actuated by said instrument through an access channel passing through a side wall of said body.

3. The cable-stripping tool as set forth in claim 2, wherein said instrument is a free end of a stem of a second hook, said stem of said second hook also being adapted for coaction with said latching device such that said second hook may be inserted into said tool and coupled to said carrier element.

4. The cable-stripping tool as set forth in claim 2, wherein said latching device is biased to a latched state, said hook stem having an inclined surface for initially opening said latching device as said stem is inserted in said carrier element so that an opening on said stem can be brought into coaction with said latching device by further axial displacement of said stem.

5. The cable-stripping tool as set forth in claim 2, wherein said hook stem includes an opening for said coacting with said latching device, said opening receiving a spring-loaded latch pin of said latching device into an engagement position.

6. The cable-stripping tool as set forth in claim 5, wherein said hook stem has a beveled portion with which said latch pin can be returned from said engagement position against a spring bias thereof when said hook stem is initially inserted into said carrier element.

7. The cable-stripping tool as set forth in claim 2, wherein said end position of said carrier element is defined by an unloaded state of said spring element.

8. The cable-stripping tool as set forth in claim 7, wherein said access channel is aligned with said latching device when said carrier element is in said end position.

9. The cable-stripping tool as set forth in claim 6, wherein said free end of said hook stem has a rod portion that, when inserted through said access channel, acts as a key to urge said latch pin out of said opening.

10. The cable-stripping tool as set forth in claim 1, wherein said hook stem includes a shoulder adjacent said upper hook portion that coacts with said upper wall to define a lower end position of said carrier element coupled to said hook stem.

11. A cable-stripping tool comprising:
    a body having first and second openings in an upper wall thereof;
    a central pin mounted in said body and extending in a generally axial orientation with respect thereto, an upper end part of said pin carrying a cutting blade and projecting through said first opening;
    a carrier element that is supported on said central pin and axially movable relative thereto, said carrier element having a latching device thereon and being biased toward an end position by a spring;
    a plurality of hooks, each hook having a stem and a curved upper hook portion with a concave side which faces toward said cutting blade to receive a cable to be stripped, the free end of the stem of a first hook of said plurality of hooks being inserted through said second opening into said body so as to be generally parallel with respect to said pin and coupled to said carrier element through coaction of said hook stem with said latching device so that said first hook is axially movable with said carrier element;
    said latching device being actuatable from outside said tool by a second hook of said plurality of hooks without dismantling said tool such that said stem of said first hook operatively coupled within said body is released from said latching device through action of the stem of said second hook, after which said first hook is withdrawn through said second opening for replacement with said second hook or another of said plurality of hooks.

12. The cable-stripping tool as set forth in claim 11, wherein said latching device is actuated by said second hook through an access channel passing through a side wall of said body.

13. The cable-stripping tool as set forth in claim 12, wherein said latching device is biased to a latched state, said hook stem of said first hook having an inclined surface for initially opening said latching device as said first hook stem is inserted in said carrier element so that an opening on said first hook stem can be brought into coaction with said latching device by further axial displacement of said first hook stem.

14. The cable-stripping tool as set forth in claim 12, wherein the hook stem of each of said plurality of hooks includes an opening for said coaction with said latching device, said opening for receiving a spring-loaded latch pin of said latching device into an engagement position.

15. The cable-stripping tool as set forth in claim 14, wherein each hook stem has a beveled portion with which said latch pin can be returned from said engagement position against a spring bias thereof when a respective hook stem is initially inserted into said carrier element.

16. The cable-stripping tool as set forth in claim 15, wherein said free end of said hook stem has a rod portion that, when inserted through said access channel, acts as a key to urge said latch pin out of said opening.

17. The cable-stripping tool as set forth in claim 12, wherein said end position of said carrier element is defined by an unloaded state of said spring element.

18. The cable-stripping tool as set forth in claim 17, wherein said access channel is aligned with said latching device when said carrier element is in said end position.

19. The cable-stripping tool as set forth in claim 11, wherein said plurality of hooks have different effective stem lengths to accommodate cables of different sizes by said curved upper hook portions thereof.

20. The cable-stripping tool as set forth in claim 11, wherein each of said plurality of hooks includes a shoulder adjacent said upper hook portion that coacts with said upper wall to define a lower end position of said carrier element.

* * * * *